Nov. 11, 1947.  L. V. COLWELL  2,430,843
MACHINE TOOL SPINDLE
Filed April 8, 1944  3 Sheets-Sheet 1
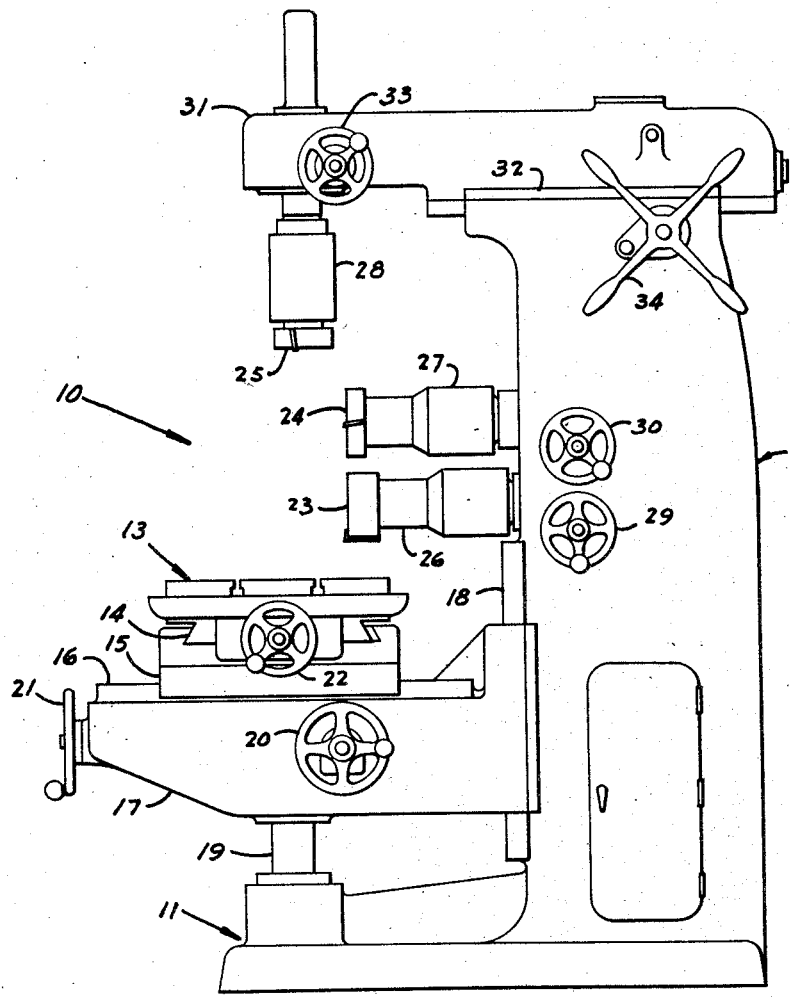
Fig. I
INVENTOR.
Lester V. Colwell
BY
Marshall & Marshall
ATTORNEYS

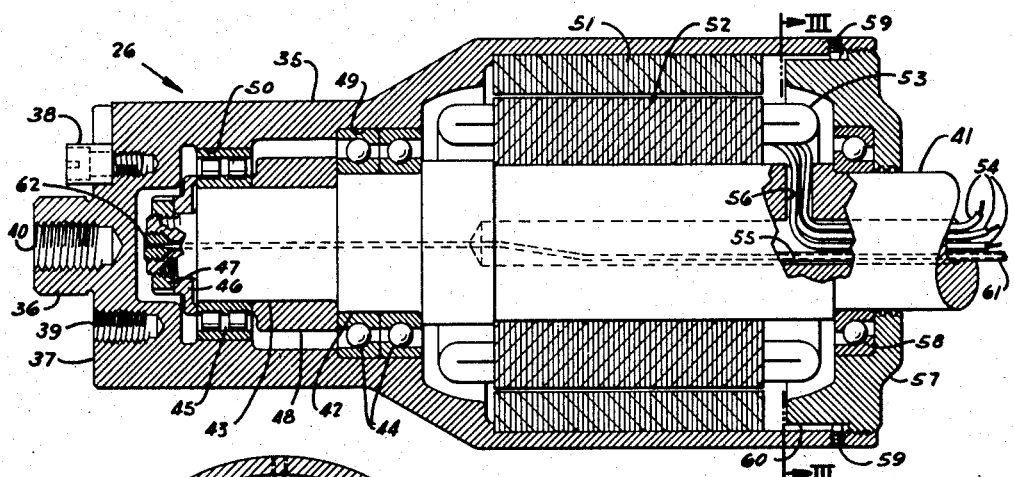
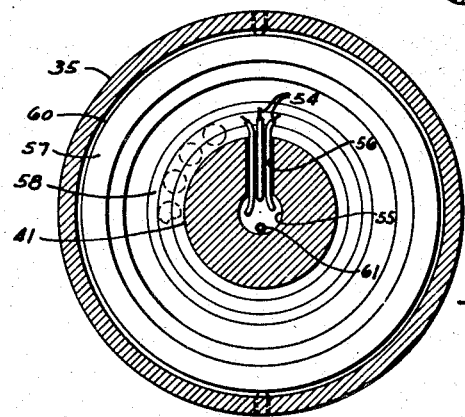
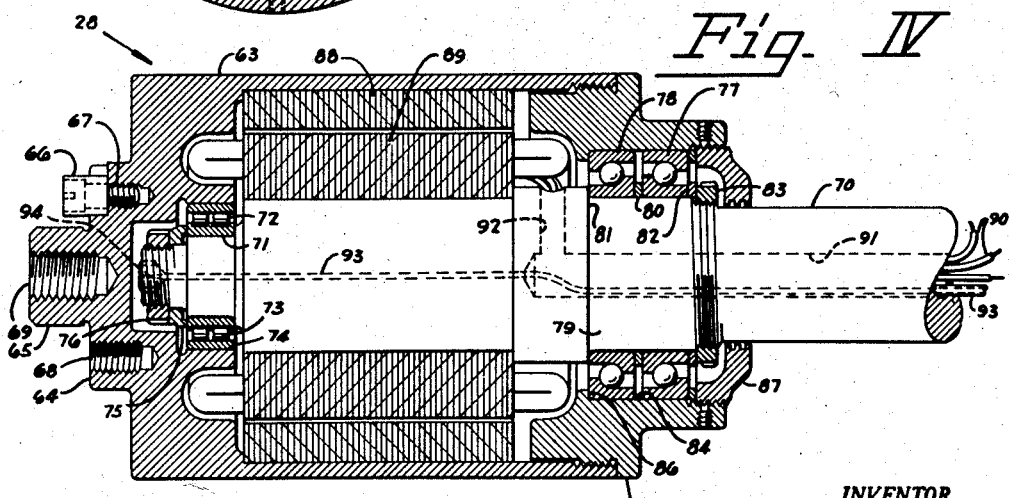

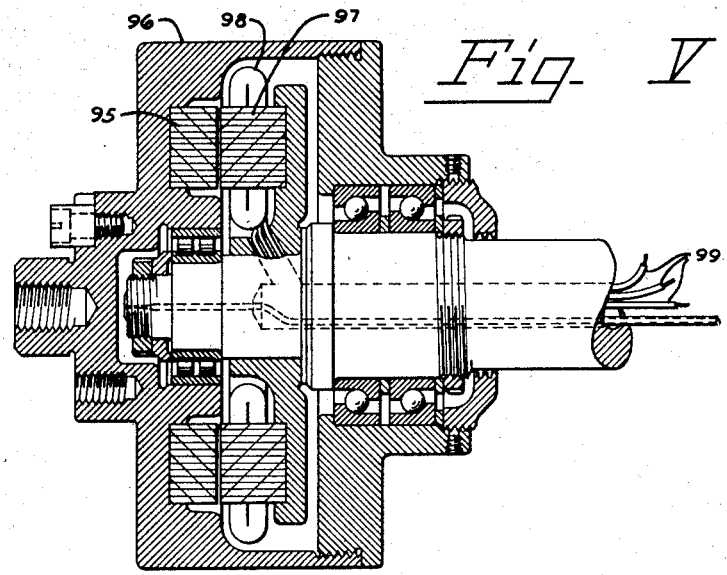
Fig. V
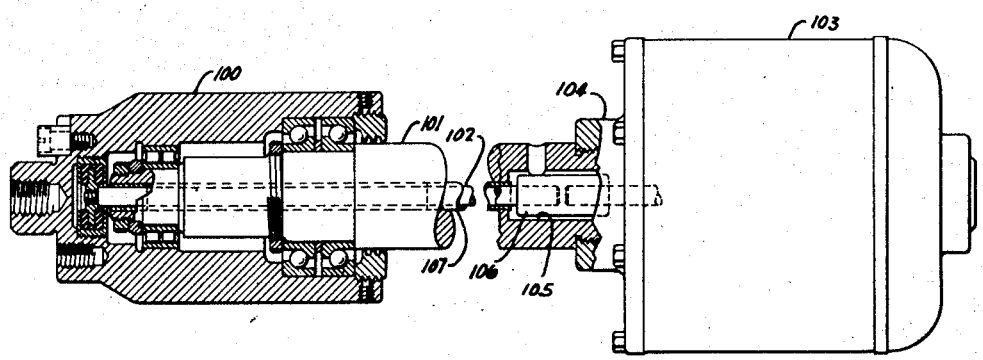
Fig. VI
INVENTOR.
Lester V. Colwell
BY
Marshall & Marshall
ATTORNEYS Patented Nov. 11, 1947

2,430,843

UNITED STATES PATENT OFFICE 2,430,843

MACHINE TOOL SPINDLE

Lester V. Colwell, Ann Arbor, Mich., assignor to Defiance Machine Works, Inc., Defiance, Ohio, a corporation of Ohio Application April 8, 1944, Serial No. 530,084

1 Claim. (Cl. 90—11)

This invention relates to a tool-holding spindle for machine tools such as milling machines and drilling machines, and in particular to a high-speed self-contained machine tool spindle.

Some machine tools utilize cutting tools mounted on spindles which rotate to provide a major portion of the total relative cutting speed between the cutting tool and the part being cut. In the use of such machine tools, it is customary to clamp the work in a suitable work-holding and locating device which has been adjusted into a position relative to the path of the cutting tool such that the feeding motion which may be imparted to the cutting tool or the work-holding device or both will enable the cutting tool to produce a regular surface having the intended relationship with given reference points.

To obtain a smooth machined surface it is necessary that the machine be sufficiently rigid and the rotating parts be sufficiently balanced so that there is little or no relative deflection of the parts as the cutter engages the work and so that vibrations are minimized; that the feeding motion be accurate; and that each tooth of the cutter do its intended share of the work. The degree of conformance of the machined surface to its intended shape is determined by the accuracy of the feeding motion, because that determines the relative position of the work and the cutter.

The smoothness of the surface depends upon the accuracy of the setting of the teeth in the cutter, the advance of the work per revolution of the cutter, the accuracy with which the cutter follows the same path during successive revolutions, and the nature of the metal flow during metal removal.

As the amount of feed per cutter tooth (that is, the rate of approach between the work and the path of the cutting edges) is increased, each tooth of the cutter will leave a more appreciable groove, or tool mark, causing greater surface roughness. Thus, the machined surface may consist of many regularly recurring surfaces, each of which may be quite smooth, in relatively precise geometric relationship with each other so as to form a larger, composite surface of regular proportions but with an aggregate roughness greater than that of one of the component surfaces.

The same effect occurs if the individual teeth in the cutter are not accurately set, because in this case the tooth taking the deepest cut will leave its mark independently of the others.

Vibration of the tool with respect to the work, commonly called chatter, also shows up as a roughness of the surface without affecting the general shape of the surface. Thus to obtain a good surface, i, e, one which is both smooth and accurate, it is necessary that the traversing or feeding mechanism of the machine move steadily and accurately, that each tooth of the cutter do its share of the work, and that each tooth of the cutter follow exactly the same path in its successive revolutions. Further, it has been found that the surface speed of the cutter tooth moving over the work affects the resulting smoothness as well as does the depth of the cut. In working with the nonferrous alloys, it has been found that better results are obtained if the surface speed is raised and the depth of the cut correspondingly reduced.

It is an object of this invention to provide a tool-holding spindle which is adaptable for high speed operation.

Another object of this invention is to provide a high-speed machine tool cutter drive incorporating a large amount of rotating mass adjacent the cutter whose inertia stabilizes the cutter.

Another object is to provide a self-contained machine tool spindle such that several may be incorporated in one machine to simultaneously operate on several surfaces of the work.

Another object is to provide a machine tool spindle in which the rotating parts surround the end of and are supported on a stationary axle which may be clamped in the framework of a milling machine, boring mill, or similar machine tool.

More specific objects and advantages are apparent from the description, in which reference is had to the accompanying drawings illustrating an improved form of milling machine spindle embodying the invention.

In the drawings:

Figure I is an elevation of a milling machine incorporating several cutter spindles for simultaneously operating on several surfaces of the work.

Figure II is a longitudinal cross section through one of the milling machine spindles.

Figure III is a section taken along the line III—III of Figure II.

Figure IV is a longitudinal cross section of a shorter, larger diameter milling machine spindle.

Figure V is a longitudinal cross section of a still shorter form of spindle.

Figure VI is an elevation, partly in section, of another form of the invention in which the driving motor is separated from the cutter.

These figures illustrate an example of a machine tool spindle by which the advantages of the invention may be obtained.

These advantages, the provision of a stabilizing mass adjacent the cutter and reduced bearing size without sacrifice of rigidity, are obtained by providing a stationary axle upon which the cutter spindle is rotatably mounted. Thus, the rotating mass is distributed at a maximum radial distance from the center of rotation to provide a large polar and diametral moment of inertia while the supporting bearings are relatively small size and are located as near as possible to the cutting tool.

In a conventional machine tool employing a rotating cutter, the cutter is carried on a rotating shaft or spindle. It quite often happens that the machine may be overloaded and the spindle or shaft bent. As it is practically impossible to straighten a bent shaft to its original condition, such an accident practically ruins the shaft or spindle for a further precision work. When the spindle is rotated about a stationary axle, as is illustrated in the examples shown in the drawings, overloading bends the axle (which is clearly the weakest part of the structure) but does not injure the spindle otherwise. Since the axle is not rotating such a bending or deformation does not change the balance of the tool nor its serviceability but merely changes the operating plane of the cutter with respect to the work-holding fixture. It is a comparatively simple matter to straighten the axle sufficiently to provide satisfactory operation because the required accuracy is merely that necessary to maintain the dimension between the cutting plane and the work-holding fixture and not to secure running truth of the cutter.

The examples shown in the specific drawings and the following specific description merely disclose and illustrate the invention and are not intended to impose limitations upon the claims.

A milling machine 10 comprises a base 11, and a column 12 erected from the base 11. The milling machine 10 is equipped with a work supporting table 13 which is carried in dovetail ways 14 on a saddle 15. The saddle 15 is in turn carried on ways 16 of a knee 17 which, in turn, is guided by vertical ways 18 forming a part of the column 12, and is raised by an elevating screw mechanism 19. Work clamped to the table 13 is moved vertically by rotation of a hand wheel 20, is moved toward or away from the column 12 by rotation of a hand wheel 21, and is moved transversely by rotation of a third hand wheel 22. As is common practice, any or all of the feeds may be power driven by providing suitable mechanism in the knee and saddle.

Milling cutters 23, 24 and 25 are mounted on cutter spindles 26, 27 and 28 respectively. The cutter spindles 26 and 27 are adjustably held in the column 12 by clamping means actuated by hand wheels 29 and 30. The cutter drive 28 is mounted vertically in an over-hanging arm 31 carried in ways 32 at the top of the column 12. The cutter 28 is adjustable vertically by means actuated by a hand wheel 33 and is adjustable horizontally by means of handles 34 which provide motion of the arm 31 in the ways 32.

From the illustration of three cutter spindles as shown in Figure I, it is to be inferred that others may be added or some of these removed as occasion may demand. This is possible since each of the cutter spindles is a unit complete in itself.

Details of the cutter spindle 26 or 27 are shown in Figure II. The cutter spindle 26 comprises an outer rotating cup or thimble shaped shell 35, the end of which is provided with a machined cylindrical surface 36 and a flat surface 37 to accurately position a milling cutter, and tongues 38 recessed in the surface 37 to transmit torque to the cutter. A series of four equally spaced tapped holes 39 are provided in the surface 37 for attaching various types of face mills. The tongues 38 of which there are two are fitted in diametrically opposed recesses located between the tapped holes 39. A centrally located tapped hole 40 is provided for securing shell mills which are fitted over the cylindrical surface 36 but which can not be attached by bolts threaded into the holes 39. Thus milling cutters may be attached either by bolting them against the end surface 37 by bolts threaded into tapped holes 39, or they may be clamped by means of a single bolt threaded into the centrally located hole 40.

The rotating shell 35 is journaled on a stationary axle 41 which, near its end, is turned down to form seats 42 and 43 to receive the inner races of ball bearings 44 and roller bearings 45 respectively. The end of the axle 41 is still further reduced in diameter and is threaded to receive a clamping ring 46 and a lock nut 47 which secure the bearing races in place. In assembly, the ball bearings 44 are first placed on the surface 42, then a spacer ring 48 is pushed over the surface 43 and against the inner races of the ball bearings 44, then the roller bearing 45 is put in place next to the spacer ring 48 and finally the clamping ring 46 is locked in place by the lock nut 47 screwed on the end of the axle. The outer races of the ball bearings 44 and roller bearings 45 engage machined surfaces 49 and 50 located in the interior of the rotating shell 35.

The shell 35 is driven by an induction motor comprising an armature 51 and a field 52. The field of the motor is mounted on the stationary axle 41 within the space surrounded by the rotating shell 35. The armature 51 of the motor, of annular form, is located and locked in the rotating shell 35 radially adjacent the field 52. Windings 53 of the motor are supplied with electrical power through leads 54 which are threaded through holes 55 and 56 drilled in the stationary axle 41. The end of the rotating shell 35, containing the motor, is closed by an end bell 57 threaded into the shell 35. The end bell 57 is also supported from the axle 41 by means of a ball bearing 58.

To maintain the exact position of the rotating shell 35 with respect to the stationary axle 41, the ball bearings 44 and 58 are given an axial preload by screwing the end bell 57 into the shell 35. The end bell is then locked in position by a pair of set screws 59 threaded through the shell 35 and engaging a rim 60 of the end bell 57.

The bearings are lubricated by an oil mist produced by forcing air and oil through a tube 61, led through the axial hole accommodating the motor leads and a smaller continuation of it leading to the end of the axle 41, and a nozzle 62 located in the end of the axle 41. The oil-laden air, after leaving the nozzle 62, filters through the various bearings and escapes through the clearance space between the end bell 57 and the axle 41.

This form with the necked down end portion is preferable where the space is limited and a larger diameter of the rotating shell would make it impossible to reach certain of the surfaces to be machined. Therefore, it has been shown with the portion adjacent the cutter reduced in diameter with respect to the portion enclosing the motor. It is desirable however to keep as much mass as possible in the rotating shell 35 adjacent the cutter since this mass provides by flywheel effect an inertial rigidity which drives a cutter through its cut with a minimum of deviation from its intended path when engaging the work.

In other applications where a larger diameter is not objectionable, the over-all length may be reduced and one set of bearings eliminated. The spindle 28, shown in a vertical position in Figure I and in detail in Figure IV, is of such construction. This spindle comprises a rotating cup or thimble shaped shell 63, the end of which is machined to form surfaces 64 and 65 adapted to receive milling cutters. A tongue 66 held in a rectangular recess in the surface 64 by a screw 67 transmits driving torque from the spindle shell 63 to the attached cutter. The milling cutters are secured against the surface 64 by means of bolts threaded into tapped holes 68 or by means of a single bolt threaded into an axial hole 69 which is bored and threaded concentrically with the cylindrical surface 65.

The rotating shell 63 is journaled on an axle 70 which at its outer end is necked down to form a seat 71 for a roller bearing 72 whose outer race 73 engages a cylindrical machined surface 74 in the interior of the rotating shell 63. The inner race of the roller bearing is clamped onto the axis 70 by means of a clamping ring 75 and a nut 76.

The other end of the rotating shell 63 is carried on a pair of ball bearings 77 and 78 whose inner races are fitted onto a machined surface 79 of the axle 70. The inner races of the two ball bearings are separated by a spacer ring 80 and are clamped tightly between a shoulder 81 on the axle 70 and a clamping ring 82 which is held in place by a clamping nut 83 threaded on the axle 70. The outer races of the ball bearings 77 and 78 are received in a bore 84 in an end bell 85 screwed into the end of the rotating shell 63 opposite the cutter supporting surfaces and are tightened against a shoulder 86 at the inner end of the bore 84 by a pre-loading nut 87 threaded into the end of the bore 84. Because there is no spacing ring between the outer races of the ball bearings 77 and 78 the tightening of the pre-loading nut 87 produces an axial preload on the bearings 77 and 78 and thus provides a rigid yet rotatable connection between the rotating cup shaped shell 63 and the stationary axle 70.

The rotating shell 63 is driven by a built-in electric motor whose armature 88 of annular form is pressed into and rotates with the shell 63 and whose field structure 89 is supported on the axle 70. Electrical power for the motor is brought in through leads 90 which are threaded through an axial hole 91 and a transverse hole 92 drilled in the axle 70. Lubrication for the bearings, which for high-speed operation must be in the form of an oil mist suspended in the air, is provided by pumping air and oil through a tube 93 extending axially through the axle 70 and terminating in a nozzle 94 located at the end of the axle 70. The oil laden air circulates back through the bearings and escapes through the clearance space between the axle 70 and the end bell 85.

This structure has an advantage over that first described in that more of the rotating mass is concentrated near the cutter and thus provides greater inertial stability in operation.

It is possible to decrease the axial length of the structure much further by modifying the form of the motor. The motor may be built with a radial air gap rather than the conventional cylindrical air gap. Referring to Figure V which shows a milling machine spindle identical with that previously described except for the driving motor, the armature of the motor consists of a ring of laminated iron 95 located in a rotating housing 96. The stationary part of the motor consists of another laminated ring 97 containing windings 98 which are connected to a source of power by leads 99. This may be called a disk type motor because the active surfaces of the armature and field are annular disks disposed at right angles to the axis of rotation. This type of motor has the advantage of an extremely short axial length at the expense of an increase in diameter. In this application it has the important advantage of concentrating the rotating mass nearer the cutter and providing a relatively large flywheel effect for the amount of material in the rotating shell.

In some cases, because of space limitations, it is impossible to use a built-in motor and still get sufficient power to drive the cutting tools. The rigidity provided by a stationary axle and a heavy rotating shell carrying the milling cutters may nevertheless be obtained. This is accomplished by journaling a heavy rotating shell 100 on a stationary axle 101 in the manner previously described in connection with Figure IV. The axle 101 is bored throughout its length to accommodate a driving shaft 102 journaled therein and resiliently engaging, in driving relationship, the rotating shell 100. A driving motor 103 is provided with an internally threaded end bell 104 adapted to be screwed onto the end of the axle 101 opposite the rotating shell 100. The end of the axle 101 adjacent the motor 103 is bored out to a larger diameter to provide, in a chamber 105, space for a coupling 106 which joins the shaft of the motor 103 to the shaft 102. The shaft 102 is prevented from whipping at high speed by a series of bearings 107 distributed along the bore in the axle 101. While this modification does not possess as much flywheel effect as the other spindles described, it nevertheless provides a good compromise between flywheel effect and space limitations.

It will be noticed that in each of these modifications appreciable mass is secured adjacent the cutter and distributed in such a manner as to provide maximum polar and diametral inertia. One of the advantages resulting from this arrangement is that the increased gyroscopic effects increase the stability of the cutter and consequently reduce the deflection of the cutter resulting from a given cutting force reacting upon the cutter. This has the effect of causing the axle, which supports the spindle, to act as a guided cantilever rather than a free cantilever, with a corresponding decrease in deflection for a given applied load. Another advantage obtained from locating the flywheel closely adjacent the cutter is a very material increase in torsional rigidity which effectively reduces vibration and chatter of the milling cutter.

The arrangement of the rotating spindle surrounding the fixed axle materially reduces the diameter of the bearings required to journal the spindle. Since the permissible operating speed of a bearing in R. P. M. is roughly inversely proportional to its diameter this arrangement allows the operating speed to be very materially increased over that permissible in conventional spindle construction where the bearings are outside the spindle.

While an electric motor has been shown as the means for driving the spindle, other prime movers such as air or hydraulic turbines are equally adaptable, and may be used with equal success. With any of these prime movers advantage is taken of the intermittent nature of high speed cutting operations to allow the flywheel effect of the spindle to provide the peak power required for making a cut from the energy stored therein by the prime mover during the time intervals between cuts.

Since the structure described may be modified without losing the advantages of the flywheel effect and small-diameter bearings, this description should be considered as merely illustrating the principles involved and not defining the scope of the invention.

Having described the invention, I claim:

A machine tool spindle for high speed operation comprising, in combination, a stationary axle, a prime mover, the stationary portion of said prime mover being mounted on said axle near, but not at, the end thereof, at least one anti-friction bearing mounted on said axle on each side of said stationary portion, a closed-end cup-like shell of substantial mass journalled on and enclosing the bearing located outside said stationary portion, said shell having an open inner end and carrying the rotary portion of said prime mover, said axle having a duct leading to the end a substantially annular member journalled on the bearing located inside said stationary portion and mounting and closing the inner end of said shell and means on the outer end of said shell for mounting work performing tools.

LESTER V. COLWELL.

REFERENCES CITED

The following references are of record in the file of this patent:

UNITED STATES PATENTS

| Number | Name | Date |
| --- | --- | --- |
| 1,500,401 | Lauer-Schmaltz | July 8, 1924 |
| 1,924,293 | Scott et al. | Aug. 29, 1933 |
| 1,893,995 | Jung | Jan. 10, 1933 |

FOREIGN PATENTS

| Number | Country | Date |
| --- | --- | --- |
| 361,824 | Germany | Oct. 19, 1922 |
| 521,370 | Great Britain | May 20, 1940 |
| 579,747 | France | Aug. 11, 1924 |